(12) United States Patent
Ichihara

(10) Patent No.: US 6,496,937 B1
(45) Date of Patent: Dec. 17, 2002

(54) PASSWORD UPDATING APPARATUS AND RECORDING MEDIUM USED THEREFOR

(75) Inventor: Masaki Ichihara, Tokyo (JP)

(73) Assignee: NEC Corp. (JP)

( * ) Notice: Subject to any disclaimer, the term of this patent is extended or adjusted under 35 U.S.C. 154(b) by 0 days.

(21) Appl. No.: 09/228,994

(22) Filed: Jan. 12, 1999

(30) Foreign Application Priority Data

Jan. 13, 1998 (JP) .......................................... 10-004744

(51) Int. Cl.[7] ................................................ H04L 9/00
(52) U.S. Cl. ........................ 713/202; 713/200; 713/201
(58) Field of Search ................................ 713/200, 201, 713/202, 168, 169; 380/255

(56) References Cited

U.S. PATENT DOCUMENTS

| | | | |
|---|---|---|---|
| 5,210,795 A | 5/1993 | Lipner et al. | |
| 5,606,663 A | 2/1997 | Kadooka | |
| 5,611,048 A | * 3/1997 | Jacobs et al. | 713/202 |
| 5,734,718 A | * 3/1998 | Prafullchandra | 380/4 |
| 6,249,868 B1 | * 6/2001 | Sherman et al. | 713/168 |

FOREIGN PATENT DOCUMENTS

| | | |
|---|---|---|
| EP | 0752636 | 1/1997 |
| JP | 62-31231 | 2/1987 |
| JP | 62-184563 | 8/1987 |
| JP | 63-285661 | 11/1988 |
| JP | 3-027639 | 2/1991 |
| JP | 3-214348 | 9/1991 |
| JP | 5-030103 | 2/1993 |
| JP | 6-125346 | 5/1994 |
| JP | 7-160638 | 6/1995 |
| JP | 07-182064 | 7/1995 |
| JP | 8-202658 | 8/1996 |
| JP | 9-114785 | 5/1997 |
| WO | 9608756 | 3/1996 |

OTHER PUBLICATIONS

Korean Office Action dated May 16, 2002 (w/ English translation of relevant portions).

Ma C., et al.: "Password Modification In A Distributed Computer System" Motorola Technical Developments, vol. 29, No. 18, Nov. 1, 1996, pp. 95/96 XP000691887.

* cited by examiner

*Primary Examiner*—Ly V. Hua
(74) *Attorney, Agent, or Firm*—Dickstein, Shapiro, Morin & Oshinsky, LLP.

(57) ABSTRACT

A password updating apparatus includes a current password storage section, a seed data storage section, a password generating section, a new password storage section, an access requesting section, and an update requesting section. In the current password storage section, a currently set current password is stored. In the seed data storage section, seed data serving as a seed for generating a password is stored. In the generation data storage section, generation data for generating a password is stored. The password generating section generates a new password from the seed data stored in the seed data storage section in accordance with the generation data stored in the generation data storage section. The new password storage section stores the new password generated by the password generating section. The access requesting section requests access to another computer through a communication line by using the current password stored in the current password storage section. The update requesting section requests another computer connected in accordance with the request from the access requesting section to update the current password used for the access to the new password stored in the new password storage section. A recording medium used for this apparatus is also disclosed.

13 Claims, 6 Drawing Sheets

PASSWORD UPDATING APPARATUS AND RECORDING MEDIUM USED THEREFOR

BACKGROUND OF THE INVENTION

1. Field of the Invention

The present invention relates to a password updating apparatus for automatically updating a password used to access a network through a computer as a communication terminal unit and a computer-readable recording medium used therefor to store a program for implementing a method of automatically updating a password.

2. Description of the Prior Art

As computer communications using the Internet become popular, password theft on networks poses problems. To prevent damage caused by such password theft, providers who provide Internet services recommend that users periodically update their passwords.

In general, however, it is difficult for a user to think out a new password and store and manage it because the password needs to be a string of characters that are incomprehensible to third parities. For this reason, many users register plain passwords just once, and use them for long periods of time. If, therefore, a password is stolen on a network, information is stolen by the stolen password.

Methods of preventing damage caused by such password theft by automatically updating passwords are disclosed in Japanese Unexamined Patent Publication Nos. 62-31231 and 62-184563.

The technique disclosed in Japanese Unexamined Patent Publication No. 62-31231 is, however, associated with the passwords to be set in terminal units. If this technique is directly applied to the password set by a user, the user must still store and manage the password. According to the technique disclosed in Japanese Unexamined Patent Publication No. 62-184563, when a recording medium such as a floppy disk in which a password is stored is stolen, the user cannot access a provider even if he/she stores and manages the password stored in the recording medium in a different manner.

SUMMARY OF THE INVENTION

The present invention has been made in consideration of the above situation in the prior art, and has as its object to provide a password updating apparatus capable of automatically updating a password without giving a user any trouble, and a computer-readable recording medium used therefor to store a program for implementing a method of automatically updating a password.

It is another object of the present invention to provide a password updating apparatus capable of automatically updating a password to prevent damage caused by password theft on a communication line, and a computer-readable recording medium used therefor to store a program for implement a method of-automatically updating a password.

In order to achieve the above the objects, according to the first principal aspect of the present invention, there is provided a password updating apparatus comprising:

(a) a current password storage section in which a currently set current password is stored;

(b) a seed data storage section in which seed data serving as a seed for generating a password is stored;

(c) a generation data storage section in which generation data for generating a password is stored;

(d) a password generating section for generating a new password from the seed data stored in the seed data storage section in accordance with the generation data stored in the generation data storage section;

(e) a new password storage section for storing the new password generated by the password generating section;

(f) an access requesting section for requesting access to another computer through a communication line by using the current password stored in the current password storage section; and (g) an update requesting section for requesting another computer connected in accordance with the request from the access requesting section to update the current password used for the access to the new password stored in the new password storage section.

According to the password updating apparatus of the first main aspect, the current password used to access another computer is sequentially updated without giving the user the trouble of storing and managing the password. In other words, the password can be automatically updated without giving the user any trouble. Since the password output onto the communication line is sequentially updated, damage caused by password theft on the communication line can be prevented.

The password updating apparatus of the first main aspect can further comprise an input section for inputting seed data to be stored in the seed data storage section.

As the seed data input with the input section, for example, an absolute password that can be easily memorized by the user can be generated.

In the password updating apparatus of the first principal aspect, the password generating section further comprises a monitoring section for monitoring the time at which the new password is to be generated, the password generating section generates the new password in accordance with the monitoring result obtained by the monitoring section, and the update requesting section requests updating of the password to be used for future access to the connected another computer when the password generating section generates the new password.

In this case, the monitoring section can be designed to request updating of the password used for future access to be connected to another computer when the password generating section generates a new password.

The password updating apparatus of the first principal aspect may further comprise a first password updating section for causing the current password storage section to store the new password stored in the new password storage section as a current password when a password update request is generated by the update requesting section.

In the password updating apparatus of the first principal aspect, the apparatus further comprises a password history storage section for storing at least one password used in the past to access another computer, and a notification information storage section for storing notification information indicating whether confirmation of updating of the password is notified from another computer in response to a request from the update requesting section, and the access requesting section generates a request to access another computer through the communication line by sequentially using the current password stored in the current password storage section and the past passwords stored in the password history storage section when the notification information stored in the notification information storage section indicates that "confirmation of updating of the password is not notified from another computer".

According to this arrangement, in the password updating apparatus of the first principal aspect, the access requesting section can further comprise a second password updating section for, when access to another computer is requested by using the past password stored in the password history storage section, and connection to another computer is established in accordance with the request, causing the password storage section to store as a current password the past password used by the access requesting section to generate a request to access another computer.

With this arrangement, even if, for example, the completion of updating of the password is not notified from another computer, since access to another computer can be tried with the current password or one of the past passwords, the password can be restored at a considerably high probability.

In the password updating apparatus of the first principal aspect, a plurality of computers can be connected to the communication line. In this case, another computer to which an access request is generated by the access requesting section is one of the plurality of computers which can be connected to the communication line, the generation data storage section stores a plurality of generation data corresponding to the respective computers, and the password generating section generates the new password from the seed data stored in the seed data storage section in accordance with generation data, of the plurality of generation data stored in the generation data storage section, which corresponds to another computer to which the access request is generated by the access requesting section.

With this arrangement, since different passwords are output onto the communication line for the respective other computers to be connected, damage caused by password theft can be prevented more effectively.

In order to achieve the above objects, according to the second main aspect of the present invention, there is provided a recording medium storing a program for executing:

(A) a current password storage function of securing a storage area in which a currently set current password can be stored;

(B) a seed data setting function of setting seed data serving as a seed for generating a password;

(C) a generation data setting function of setting generation data for generating a password;

(D) a password generating function of generating a new password from the seed data set by the seed data setting function in accordance with the generation data set by the generation data setting function;

(E) an access requesting function of requesting access to another computer through a communication line by using the current password stored in the storage area secured by the current password storage function; and (F) an update requesting function of requesting another computer, which is connected in accordance with the request from the access requesting function, to update the current password used for the access to the new password generated by the password generating function.

In the recording medium of the second main aspect, the password generating function may further store a program for executing a monitoring function of monitoring the time to crease the new password.

In this case, the password generating function generates the new password in accordance with the monitoring result obtained by the monitoring function, and the update requesting function generates a request to update the password to be used for future access to the connected another computer when the password generating section generates a new password.

The recording medium of the second main aspect may further store a program for executing a password updating function of causing the current password storage function to store as a current password in the storage area the new password generated by the password generating function when a password update request is generated by the update requesting function.

The recording medium of the second main aspect can further store a program for executing:

a password history storage securing function of securing a storage area for storing at least one password used by the access request function in the past to access another computer, a password history storage function of, when the new password generated by the password generating function is stored as a current password in the storage area secured by the current password storage function, storing the current password as a past password in the storage area secured by the password history storage securing function;

a notification information storage securing function of securing a storage area for storing notification information indicating whether confirmation of updating of a password is notified from another computer, in response to a request from the update requesting function, and a notification information storage function of storing notification information indicating that confirmation of updating of a password is notified in the storage area secured by the notification information storage securing function when confirmation of updating of the password is notified from another computer.

The access requesting function can request access to another computer through the communication line by sequentially using the current password stored in the storage area secured by the password storage securing function and the past passwords stored in the storage area secured by the password history storage securing function when the notification information stored in the storage area secured by the notification information storage securing function indicates that "confirmation of updating of the password is not notified from another computer".

The above and many other objects, features and advantages of the present invention will become manifest to those skilled in the art upon making reference to the following detailed description and accompanying drawings in which preferred embodiments incorporating the principles of the present invention are shown by way of illustrative examples.

DETAILED DESCRIPTION OF PREFERRED EMBODIMENT

A preferable embodiment of the present invention will be described below with reference to the accompanying drawings.

Figure 1:
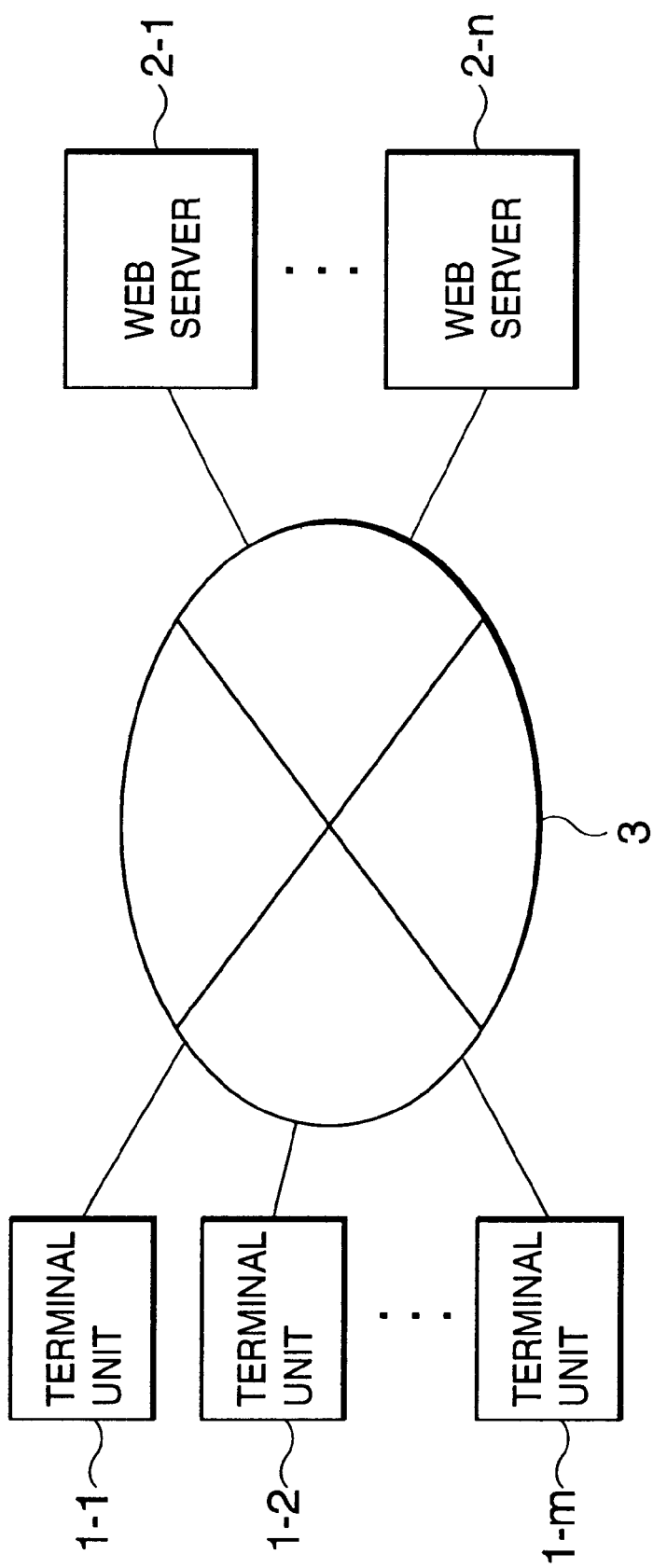
FIG. 1 is a block diagram showing an example of the arrangement of a network system according to an embodiment of the present invention.

FIG. 1 is a block diagram showing an example of the arrangement of a network system applied to the embodiment of the present invention.

As shown in FIG. 1, this network system is comprised of terminal units 1-1 to 1-*m* and Web servers 2-1 to 2-*n* connected to the terminal units 1-1 to 1-*m* through a communication line 3.

The communication line 3 is a wide area communication line such as an ISDN. Each of the Web servers 2-1 to 2-*n* is a computer set in each Internet service provider and is connected to the Internet (not shown). The Web servers 2-1 to 2-*n* permit access requests from the terminal units 1-1 to 1-*m* in accordance with the IDs and passwords sent from the terminal units 1-1 to 1-*m*.

Figure 2:
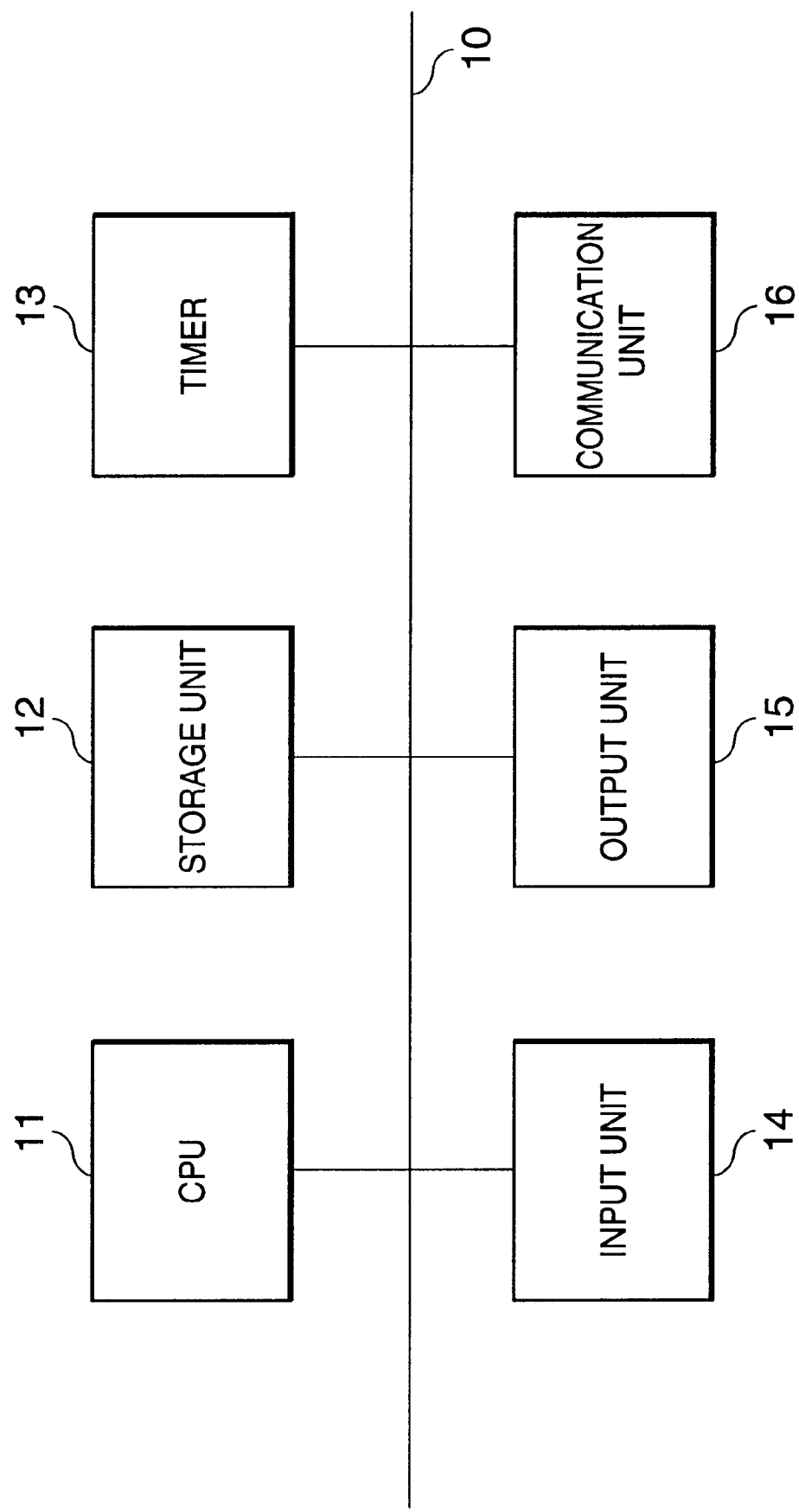
FIG. 2 is a block diagram showing an example of the arrangement of each terminal unit in FIG. 1.

Each of the terminal units 1-1 to 1-*m* functions as a client and is constituted by a personal computer and the like. As shown in FIG. 2, each of the terminal units 1-1 to 1-*m* is comprised of a CPU 11, a storage unit 12, a timer 13, an input unit 14, an output unit 15, and a communication unit 16. The storage unit 12, the timer 13, the input unit 14, the output unit 15, and the communication unit 16 are connected to the CPU 11 through a bus 10.

The CPU 11 executes the processing programs stored in the storage unit 12 to implement the function to be described later and other functions. The storage unit 12 is constituted by a main storage unit and an auxiliary storage unit and is used to store the processing programs for the CPU 11. In addition, the storage unit 12 is used as a work area for the CPU 11 and a data area for the processing programs executed to implement the function to be described later. The timer 13 measures the date and time.

The input unit 14 is constituted by a keyboard, a mouse, and the like. The input unit 14 is operated by the user to input a command to the CPU 11 or an absolute password (to be described later). The output unit 15 is constituted by a display unit and the like. The output unit 15 outputs the processing result obtained by the CPU 11 and displays it to the user. The communication unit 16 is a DSU (or a modem if the communication line 3 is an analog line). The communication unit 16 controls data communication between each of the terminal units 1-1 to 1-*m* and a corresponding one of the Web servers 2-1 to 2-*n*.

Figure 3:
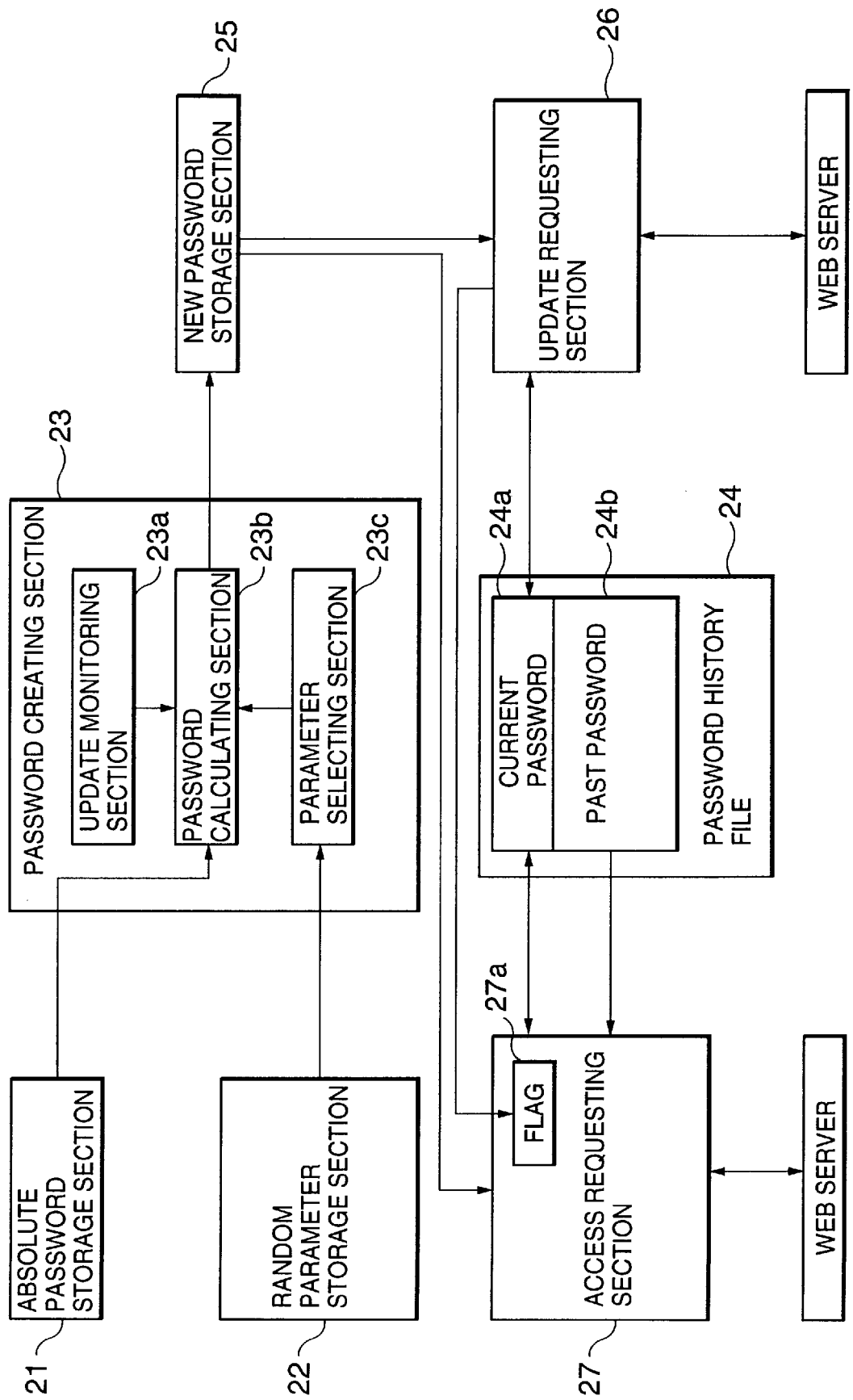
FIG. 3 is a block diagram showing the function implemented by the terminal unit having the arrangement shown in FIG. 2.

FIG. 3 is a block diagram showing the function implemented by each of the terminal units 1-1 to 1-*m*.

As shown in FIG. 3, this function is comprised of an absolute password storage section 21, a random parameter storage section 22, a password generating section 23, a password history file 24, a new password storage section 25, an update requesting section 26, and an access requesting section 27.

As the absolute password storage section 21, an area is secured in the storage unit 12 or the register in the CPU 11 to store the absolute password input by the user with the input unit 14. This absolute password may be input by the user every time an access request is generated from each of the terminal units 1-1 to 1-*m* to a corresponding one of the Web servers 2-1 to 2-*n*. Alternatively, if the absolute password storage section 21 is set in the auxiliary storage unit of the storage unit 12, the absolute password may be held without being input by the user every time an access request is generated. Note that the absolute password is to be memorized by the user as a unique, absolute password. For example, the user's name or favorite words may be used.

As the random parameter storage section 22, an area is secured in the storage unit 12, in which random parameters for generating new passwords are stored in correspondence with the Web servers 2-1 to 2-*n*. As these random parameters, telephone numbers that are used to originate calls from the terminal units 1-1 to 1-*m* to the Web servers 2-1 to 2-*n* can be used.

The password generating section 23 is made up of an update monitoring section 23*a*, a password calculating section 23*b*, a parameter selecting section 23*c*. The update monitoring section 23*a* has a storage area in which the date and time at which the new password is previously generated are stored when an access request is output to a corresponding one of the Web servers 2-1 to 2-*n*. When a predetermined number of days have elapsed from the date and time measured by the timer 13 from the date and time stored in this storage area, the update monitoring section 23*a* outputs a new password calculation request to the password calculating section 23*b*.

The parameter selecting section 23*c* selects a random parameter corresponding to the Web server to which an access request is output from the random parameters stored in the random parameter storage section 22, and transfers it to the parameter calculating section 23*b*.

In response to the request from the update monitoring section 23*a*, the password calculating section 23*b* calculates and generates a new password from the absolute password stored in the absolute password storage section 21 by using the random parameter received from the parameter selecting section 23*c*. For example, the password calculating section 23*b* can calculate the new password by the following method. The absolute password is expressed in binary notation. The binary data is set as an initial value in an M-sequence generator with the same number of bits as that of the binary data. The register value obtained by shifting the register of this M-sequence generator by a number indicated by the random parameter can be used as the new password.

As the password history file 24, an area is secured in the storage unit 12. In this area, a current password 24*a* currently set as a password for accessing one of the Web servers 2-1 to 2-*n* and a past password 24*b* set in the past as a password for accessing one of the Web servers 2-1 to 2-*n* are stored. The password history file 24 is set in correspondence with each of the Web servers 2-1 to 2-*n*.

As the new password storage section 25, an area is secured in the storage unit 12 or the register in the CPU 11. In this area, the new password calculated and generated by the password calculating section 23*b* is stored.

After one of the terminal units 1-1 to 1-*m* is connected to any one of the Web servers 2-1 to 2-*n*, the update requesting section 26 requests the connected Web server to update the password in response to a request from the update monitoring section 23*a*. When the password is to be updated, the update requesting section 26 resets the flag for the access requesting section 27 and sends the current password 24*a* stored in the password history file 24 and the new password stored in the new password storage section 25 to the connected Web server. Upon reception of a password update completion notification indicating that updating of the password is complete on the Web server side, the update requesting section 26 sets a flag 27a for the access requesting section 27.

The access requesting section 27 dials the telephone number of one of the Web servers 2-1 to 2-n, and generates an access request to the Web server through the communication line 3 by using the ID number of the called Web server and the current password 24a stored in the password history file 24. Assume that the flag 27a is reset when the access request is generated. In this case, when access fails with the current password, the access requesting section 27 generates access requests to the called Web server by sequentially using the past passwords stored in the password history file 24.

The operation of the network system of this embodiment will be described below with reference to FIG. 4. The operation will be described by exemplifying the terminal unit 1-1 and the Web server 2-1. However, the same applies to the remaining terminal units and the remaining Web servers. In addition, if the password is not updated, i.e., the current password is to be continuously used, the same operation as that of the prior art is performed. Therefore, the operation to be performed when the password is to be updated will be described below. Assume that the flag 27a for the access requesting section 27 has been set.

Figure 4:
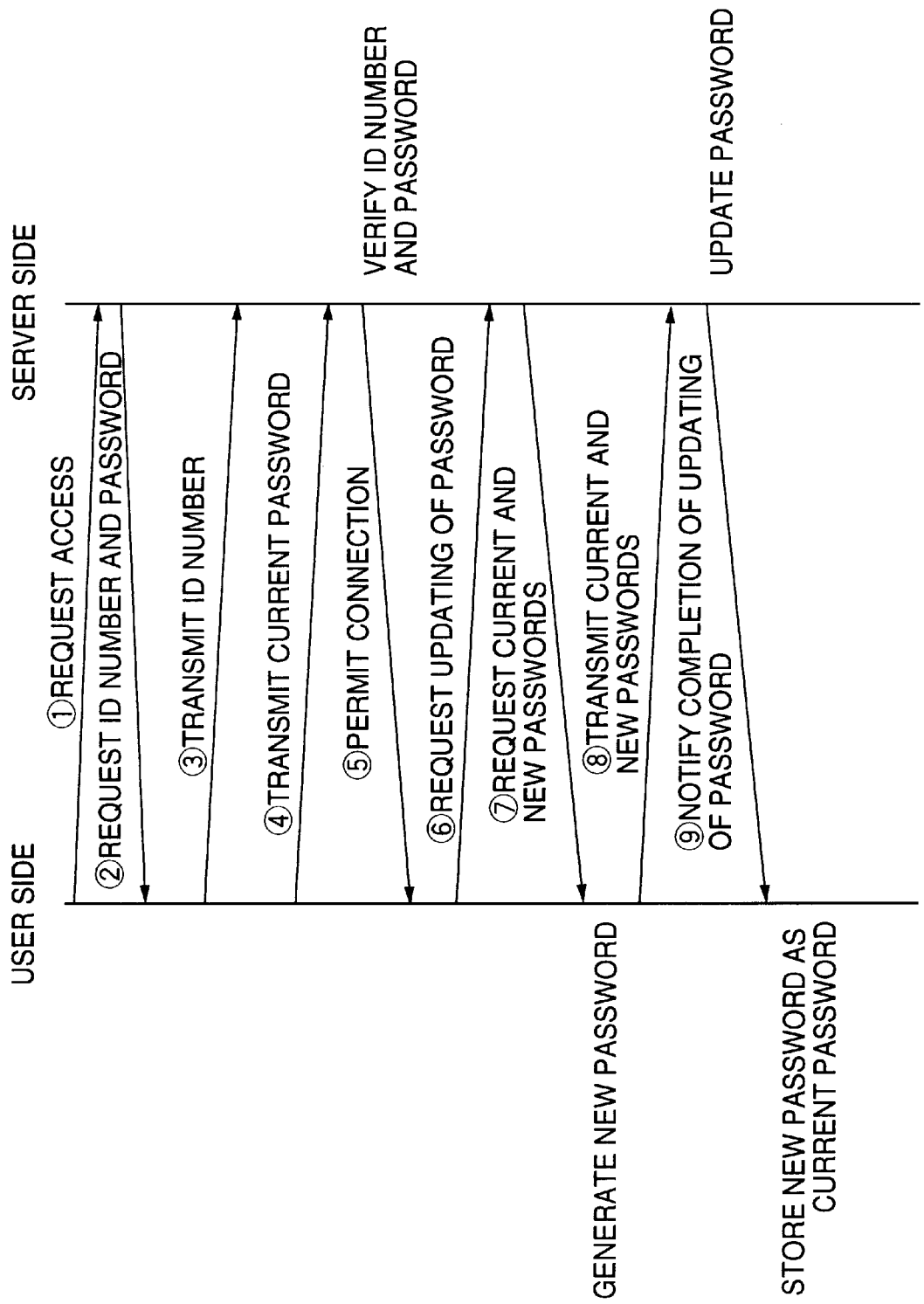
FIG. 4 is a view showing a series of operations from connection from a terminal unit to a Web server to updating of a password in the embodiment of the present invention.

When the user operates the input unit 14 to input a command for connection to the Web server 2-1, the access requesting section 27 dials the telephone number of the Web server 2-1 and outputs an access request to the Web server 2-1 ("①" in FIG. 4). In response to this request, the Web server 2-1 requests the terminal unit 1-1 to transmit the ID number and the password ("②" in FIG. 4). The access requesting section 27 of the terminal unit 1-1 receives this request.

The access requesting section 27 of the terminal unit 1-1 transmits the ID number to the Web server 2-1 ("③" in FIG. 4), and also transmits the current password 24a stored in the password history file 24 as the password to the Web server 2-1 ("④" in FIG. 4). Th Web server 2-1 collates the received ID number with the password. If they coincide with each other, the Web server 2-1 permits connection with respect to the terminal unit 1-1 ("⑤" in FIG. 4). With this operation, the terminal 1-1 logs on to the Web server 2-1.

When the access requesting section 27 of the terminal unit 1-1 receives the connection permission from the Web server 2-1, the update requesting section 26 checks whether the time to update the password, monitored by the update monitoring section 23a, has come. In this case, since the time to update the password has come, the update requesting section 26 requests the Web server 2-1 to update the password ("⑥" in FIG. 4). In response to this request, the Web server 2-1 requests the terminal unit 1-1 to transmit the password before updating (current password) and the password after updating (new password) ("⑦" in FIG. 4).

Upon reception of this request, the password calculating section 23b generates a new password from the absolute password stored in the absolute password storage section 21 in accordance with the telephone number of the Web server 2-1 which is stored in the random parameter storage section 22 and selected as a random parameter by the parameter selecting section 23c, and stores the new password in the new password storage section 25.

The update requesting section 26 transmits the current password 24a stored in the password history file 24 and the new password stored in the new password storage section 25 to the Web server 2-1 ("⑧" in FIG. 4). Upon reception of the current and new passwords, the Web server 2-1 performs processing to update the password, and sends a password update completion notification to the terminal unit 1-1 ("⑨" in FIG. 4).

Upon reception of the password update completion notification, the update requesting section 26 of the terminal unit 1-1 stores the new password, stored in the new password storage section 25, as a current password in the password history file 24. The current password that has been used is stored as a past password in the password history file 24. In addition, the update requesting section 26 sets the flag 27a for the access requesting section 27. With the above operation, the process from access from the terminal unit 1-1 to the Web server 2-1 to updating of the password is complete.

In some case, the terminal unit 1-1 cannot receive the password update completion notification owing to the influence of a malfunction or the like in the communication line 3. In this case, the flag 27a for the access requesting section 27 is kept reset.

Figure 5:
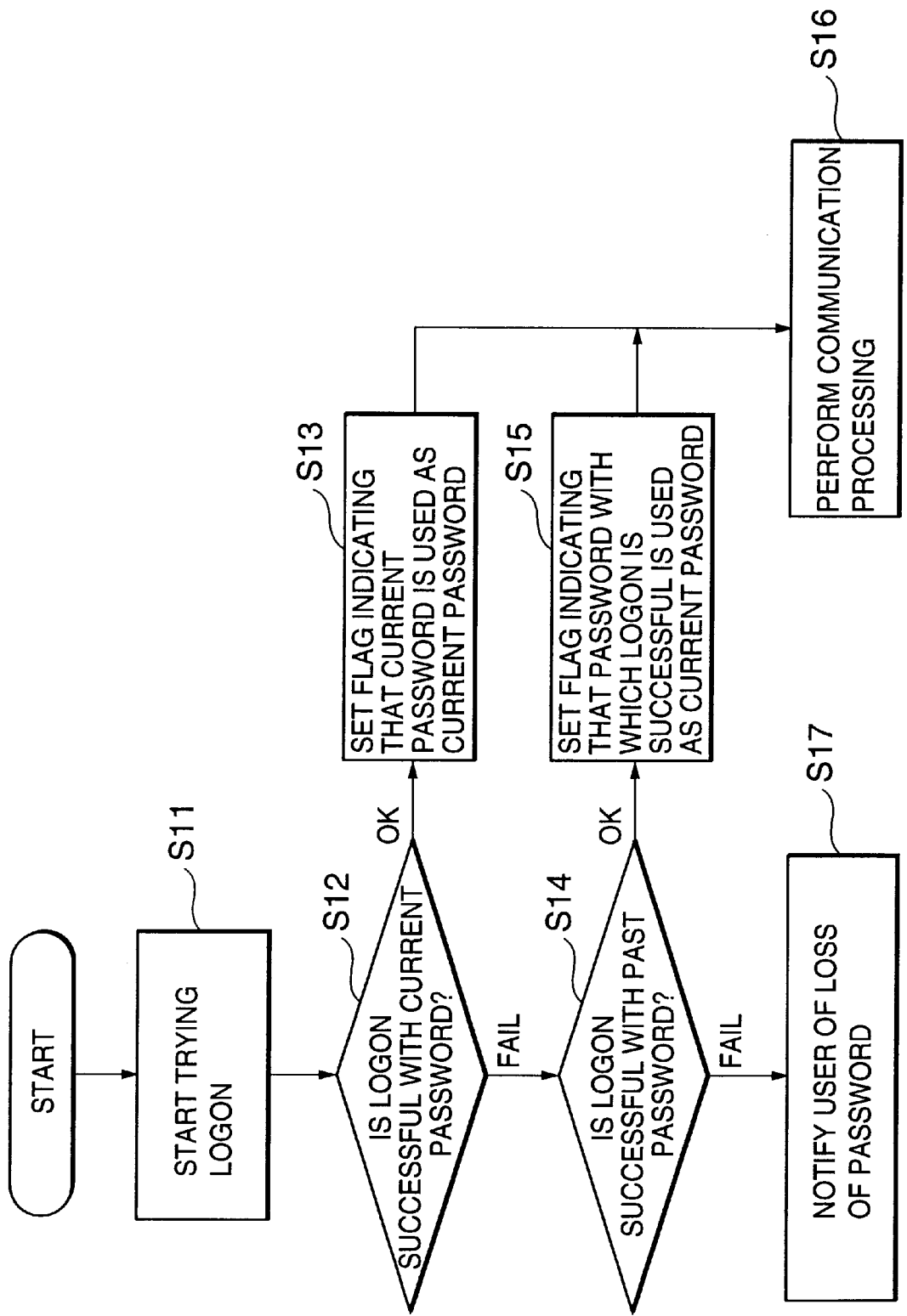
FIG. 5 is a flow chart showing the processing to be performed when no password completion notification returns, and the next access request is generated in the embodiment of the present invention.

The processing to be executed by the access requesting section 27 when a command for requesting access to the Web server 2-1 is input from the input unit 14 in this state will be described below with reference to the flow chart of FIG. 5.

When the processing starts, the access requesting section 27 dials the telephone number and sends the ID number to start trying to log on to the Web server 2-1 (step S11).

The access requesting section 27 tries to log on to the Web server 2-1 by using the current password 24a stored in the password history file 24, and checks whether logon is successful (step S12).

If it is determined in step S12 that logon is successful by using the current password, the access requesting section 27 registers the current password, stored in the password history file 24, as the current password in the current password 24a without any change, and sets the flag 27a (step S13). The flow then advances to the subsequent communication processing (step S16).

If it is determined in step S12 that logon is unsuccessful by using the current password 24a, the access requesting section 27 tries to log on to the Web server 2-1 by sequentially using the past passwords 24b stored in the password history file 24. The access requesting section 27 then checks whether logon is successful by using any one of the past passwords 24b stored in the password history file 24 (step S14).

If it is determined in step S14 logon is successful by using any one of the past passwords 24b, the access requesting section 27 registers the past password 24b that was successfully used for logon as the current password, and sets the flag 27a (step S15). The flow then advances to the subsequent communication processing (step S16).

If it is determined in step S14 that logon has failed with any of the past passwords 24b, the user is notified of the loss of the password (step S17).

As described above, in this embodiment, even if the user of each of the terminal units 1-1 to 1-m inputs only the absolute password with the input unit 14 to access one of the Web servers 2-1 to 2-n, the password output to the communication line 3 is periodically updated. The user therefore need not store and manage the password. In addition, since the password output to the communication line 3 is periodically updated, even if the password is stolen on the communication line 3, damage such as information theft can be prevented.

Even if each of the terminal units 1-1 to 1-m cannot receive any password update completion notification from a corresponding one of the Web servers 2-1 to 2-n upon generation of a password update request, since logon is tried by using the past passwords 24b, the current password as the currently set password can be restored at a considerably high probability.

In addition, since random parameters are set in correspondence with the respective Web servers 2-1 to 2-n, even if only one absolute password is used, different passwords corresponding to the respective Web servers to be accessed are output to the communication line 3. This further improves the security.

Figure 6:
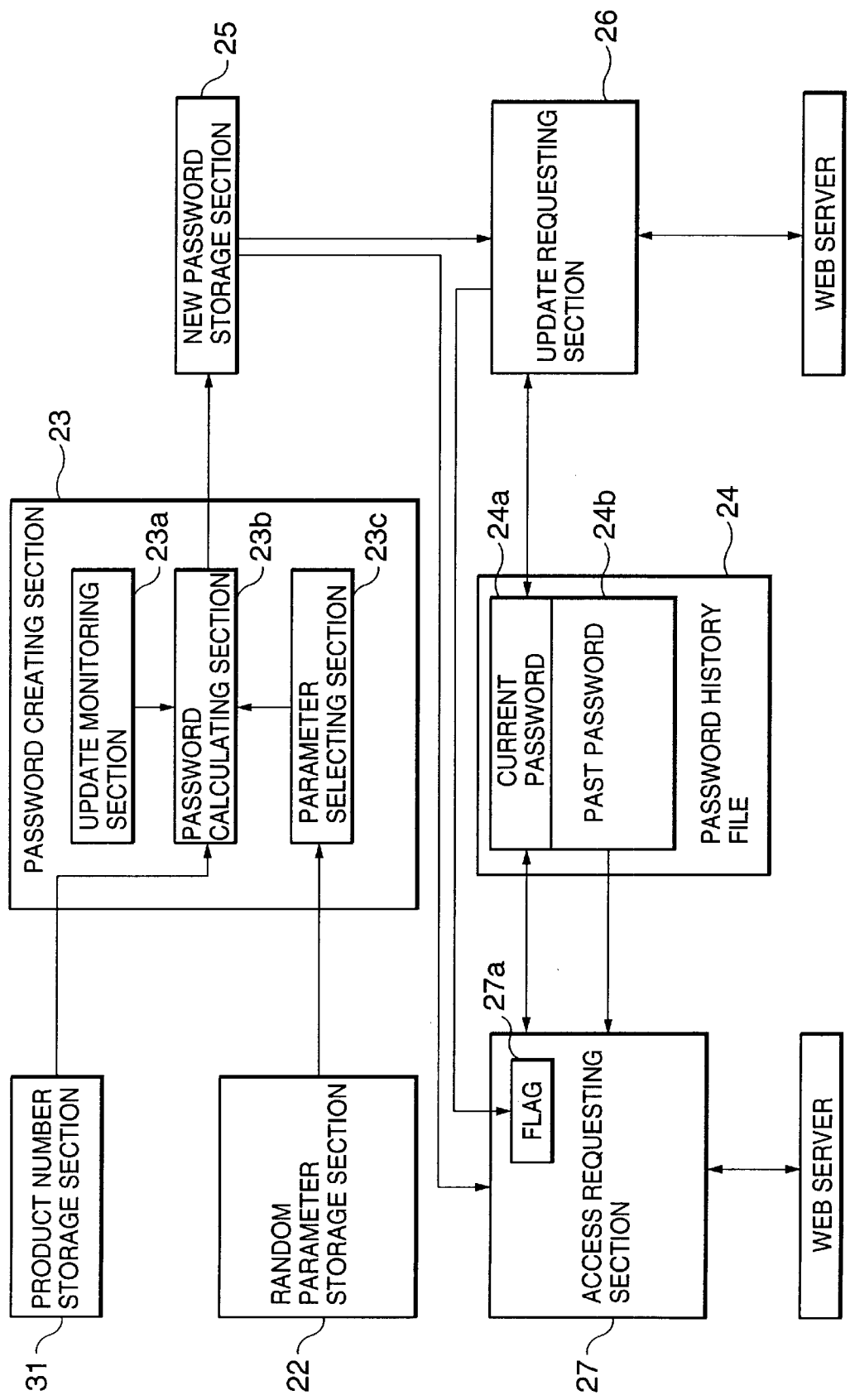
FIG. 6 is a block diagram showing the function implemented by the terminal unit having the arrangement in FIG. 2.

In this embodiment, the user operates the input unit 14 to input a specific absolute password as data serving as a seed of a new password, and stores the input password in the absolute password storage section 21. However, data serving as a seed of a new password is not limited to this data. For example, as shown in FIG. 6, the product number of each of the terminal units 1-1 to 1-m may be stored in a product number storage section 31 to be used as data serving as a seed of a new password.

In the above embodiment, the update monitoring section 23a of the password generating section 23 is implemented by interruptions caused by the input unit 14 at predetermined intervals. However, the method of implementing the update monitoring section 23a is not limited to this. For example, a counter for counting the number of times a connection request is output to each of the Web servers 2-1 to 2-n may be prepared in an auxiliary storage unit 13 to make the password calculating section 23b calculate a password by using the value of the counter. In addition, a program including a random function may be prepared as a processing program for the CPU 11 to implement the update monitoring section 23a as a section for causing the password calculating section 23b to calculate a password by using the value obtained by executing the random function. Alternatively, the password calculating section 23b may calculate a password every time a connection request is output to each of the Web servers 2-1 to 2-n. In this case, the update monitoring section 23a is not required.

In the above embodiment, as the random parameters stored in the random parameter storage sections 22, the telephone numbers used for connection to the respective Web servers 2-1 to 2-n are used. However, for example, the names or addresses of the Web servers 2-1 to 2-n can be used as random parameters.

In addition, different random parameters need not be used for the respective Web servers 2-1 to 2-n. In this case, for example, the current date and time can be used as a random parameter. In such a case, the parameter selecting section 23c in the password generating section 23 is not required. Alternatively, the user may independently inputs a random parameter with the input unit 14.

In the above embodiment, the function of the password generating section 23 is implemented by making the CPU 11 execute the processing program. However, the function of the password generating section 23 can be implemented by hardware as well as software as in the above case.

In the above embodiment, the present invention is applied to the password used to (logically) connect each of the terminal units 1-1 to 1-m to a corresponding one of the Web servers 2-1 to 2-n through the communication line 3. However, the present invention can also be applied to the password used to establish (logical) connection between computers in a LAN environment.

In the above embodiment, the processing program executed by the CPU 11 of each of the terminal units 1-1 to 1-m is stored in the auxiliary storage unit 13 and transferred to the main storage unit 12 to be executed. However, the processing program for the CPU 11 may be stored in a computer-readable recording medium such as a CD-ROM or floppy disk to be distributed, and may be installed in the auxiliary storage unit 13.

What is claimed is:

1. Password updating apparatus comprising:
   (a) current password storage means in which a currently set current password is stored;
   (b) seed data storage means in which seed data serving as a seed for generating a password is stored;
   (c) generation data storage means in which generation data for generating a password is stored;
   (d) password generating means for generating a new password from the seed data stored in said seed data storage means in accordance with the generation data stored in said generation data storage means;
   (e) new password storage means for storing the new password generated by said password generating means;
   (f) access requesting means for requesting access to another computer through a communication line by using the current password stored in said current password storage means; and
   (g) update requesting means for requesting another computer connected in accordance with the request from said access requesting means to update the current password used for the access to the new password stored in said new password storage means.

2. Password updating apparatus according to claim 1, further comprising input means for inputting seed data to be stored in said seed data storage means.

3. Password updating apparatus according to claim 1, wherein said password generating means further comprises monitoring means for monitoring the time at which the new password is to be generated, said password generating means generates the new password in accordance with the monitoring result obtained by said monitoring means, and said update requesting means requests updating of the password to be used for future access to said connected another computer when said password generating means generates the new password.

4. Password updating apparatus according to claim 1, further comprising first password updating means for causing said current password storage means to store the new password stored in said new password storage means as a current password when a password update request is generated by said update requesting means.

5. Password updating apparatus according to claim 1, further comprising password history storage means for storing at least one password used in the past to access said another computer, and notification information storage means for storing notification information indicating whether confirmation of updating of the password is notified from said another computer in response to a request from said update requesting means, and said access requesting means generates a request to access said another computer through the communication line by sequentially using the current password stored in said current password storage means and the past passwords stored in said password history storage means when the notification information stored in said notification information storage means indicates that confirmation of updating of the password was not notified from said another computer.

6. Password updating apparatus according to claim 5, wherein said access requesting means further comprises second password updating means for, when access to said another computer is requested by using the past password stored in said password history storage means, and connection to said another computer is established in accordance with the request, causing said password storage means to store as a current password the past password used by said access requesting means to generate the request to access said another computer.

7. Password updating apparatus according to claim 1, wherein a plurality of computers can be connected to said communication line, said another computer to which an access request is generated by said access requesting means is one of said plurality of computers which can be connected to said communication line, said generation data storage means stores a plurality of generation data corresponding to said respective computers, and said password generating means generates the new password from the seed data stored in said seed data storage means in accordance with generation data which corresponds to said another computer to which the access request is generated by said access requesting means.

8. A recording medium used for a password updating apparatus and storing a program for executing:

(A) a current password storage function of securing a storage area in which a currently set current password can be stored;

(B) a seed data setting function of setting seed data serving as a seed for generating a password;

(C) a generation data setting function of setting generation data for generating a password;

(D) a password generating function of generating a new password from the seed data set by said seed data setting function in accordance with the generation data set by said generation data setting function;

(E) an access requesting function of requesting access to another computer through a communication line by using the current password stored in the storage area secured by said current password storage function; and (F) an update requesting function of requesting said another computer, which is connected in accordance with the request from said access requesting function, to update the current password used for the access to the new password generated by said password generating function.

9. A recording medium according to claim 8, wherein said password generating function further stores a program for executing a monitoring function of monitoring the time to create the new password, said password generating function generates the new password in accordance with the monitoring result obtained by said monitoring function, and said update requesting function generates a request to update the password to be used for future access to said connected another computer when said password generating means generates a new password.

10. A recording medium according to claim 8, wherein said medium further stores a program for executing a password updating function of causing said current password storage function to store as a current password in the storage area the new password generated by said password generating function when a password update request is generated by said update requesting function.

11. A recording medium according to claim 8, wherein said medium further stores a program for executing a password history storage securing function of securing a storage area for storing at least one password used in the past to access said another computer, a password history storage function of, when the new password generated by said password generating function is stored as a current password in the storage area secured by said current password storage function, storing the current password as a past password in the storage area secured by said password history storage securing function;

a notification information storage securing function of securing a storage area for storing notification information indicating whether confirmation of updating of a password is notified from said another computer, in response to a request from said update requesting function, and a notification information storage function of storing notification information indicating that confirmation of updating of a password is notified in the storage area secured by said notification information storage securing function when confirmation of updating of the password is notified from said another computer, and said access requesting function requests access to said another computer through said communication line by sequentially using the current password stored in the storage area secured by said password storage securing function and the past passwords stored in the storage area secured by said password history storage securing function when the notification information stored in the storage area secured by said notification information storage securing function indicates that confirmation of updating of the password was not notified from said another computer.

12. A password updating apparatus for updating a password used in communication with a computer, the apparatus comprising:

a first memory which is effective to store a current password;

a second memory which is effective to store a seed password;

a third memory which is effective to store generation data used in generating a new password;

a password generating section which is effective to receive the seed password and generation data and to produce the new password;

an access requesting section which is effective to request access to a computer using the current password; and an update requesting section which is effective to request that the computer change the current password to the new password.

13. A method for updating a password used in communication with a computer, the method comprising:

storing a current password;

storing a seed password;

storing generation data used in generating a new password;

generating the new password based on the seed password and the generation data;

requesting access to a computer using the current password; and requesting that the computer change the current password to the new password.

* * * * *